US011951510B2

(12) United States Patent
Jang et al.

(10) Patent No.: US 11,951,510 B2
(45) Date of Patent: Apr. 9, 2024

(54) APPARATUS FOR FORMING MAGNETIC PIGMENT PATTERN ON ARTICLE AND METHOD FOR FORMING MAGNETIC PIGMENT PATTERN USING THE SAME

(71) Applicant: ASSEMS INC., Busan (KR)

(72) Inventors: Ji-Sang Jang, Busan (KR); Jae-Jeong Lee, Busan (KR); Kyoung-Kyu Kim, Busan (KR); Kyung-Seok Choi, Busan (KR); Chi-Kyun Park, Busan (KR)

(73) Assignee: ASSEMS INC., Busan (KR)

( * ) Notice: Subject to any disclaimer, the term of this patent is extended or adjusted under 35 U.S.C. 154(b) by 0 days.

(21) Appl. No.: 18/090,150

(22) Filed: Dec. 28, 2022

(65) Prior Publication Data

US 2023/0415194 A1 Dec. 28, 2023

(30) Foreign Application Priority Data

Jun. 28, 2022 (KR) ........................ 10-2022-0078994

(51) Int. Cl.

| | |
|---|---|
| ***B05C 11/02*** | (2006.01) |
| ***B05C 13/00*** | (2006.01) |
| ***B05D 3/00*** | (2006.01) |
| ***B05D 3/06*** | (2006.01) |

(52) U.S. Cl.

CPC .............. *B05D 3/20* (2013.01); *B05C 11/023* (2013.01); *B05C 13/00* (2013.01); *B05D 3/061* (2013.01)

(58) Field of Classification Search

None

See application file for complete search history.

(56) References Cited

U.S. PATENT DOCUMENTS

| | | | | |
|---|---|---|---|---|
| 7,934,451 | B2 * | 5/2011 | Raksha | B05D 3/207 492/8 |
| 8,276,511 | B2 * | 10/2012 | Raksha | B42D 25/29 492/8 |
| 8,726,806 | B2 * | 5/2014 | Raksha | B41N 10/02 427/547 |
| 2022/0144005 | A1 * | 5/2022 | Loginov | B42D 25/30 |

FOREIGN PATENT DOCUMENTS

KR 10-1080765 B1 11/2011

* cited by examiner

*Primary Examiner* — Jethro M. Pence

(74) *Attorney, Agent, or Firm* — Paratus Law Group, PLLC

(57) ABSTRACT

There is provided an apparatus for forming a magnetic pigment pattern on an article. The apparatus includes: a magnetic pattern mold having nonmagnetic pattern grooves engraved in a predetermined pattern and providing predetermined magnetic field lines on a pattern-forming object surface of an article by generating magnetism in areas outside the nonmagnetic pattern grooves; and a spray unit spraying an adhesive resin composite containing a ferromagnetic pigment onto the pattern-forming object surface of the article. A predetermined magnetic pigment pattern is formed while the magnetic pigment of the adhesive resin composite that is applied to the pattern-forming object surface of the article is rearranged along magnetic field lines generated by the magnetic pattern mold.

15 Claims, 19 Drawing Sheets

APPARATUS FOR FORMING MAGNETIC PIGMENT PATTERN ON ARTICLE AND METHOD FOR FORMING MAGNETIC PIGMENT PATTERN USING THE SAME

CROSS REFERENCE TO PRIOR APPLICATION

This application claims priority to and the benefit Korean Patent Application No. 10-2022-0078994 filed on Jun. 28, 2022, which is hereby incorporated by reference in its entirety.

BACKGROUND

The present disclosure relates to an apparatus for forming a magnetic pigment pattern on an article and a method for forming a magnetic pigment pattern using the same. In more detail, the present disclosure relates to an apparatus for forming a magnetic pigment pattern on an article, the apparatus being able to form a predetermined pattern of a magnetic pigment (hereafter, referred to as a 'magnetic pigment pattern') on the surface of an article by spraying a resin composite mixed with a magnetic pigment onto the surface of an article, such as a shoe, a home appliance case, an automotive interior material, an interior product, etc., and then by arranging the magnetic pigment along predetermined magnetic field lines in the resin, and a method for forming a magnetic pigment pattern using the same.

There have been many efforts to implement various patterns and colors and maintain excellent properties in order to more freely design products having complicated 3D shapes and various sizes.

Various surface treatment methods have been applied, for example, to the midsole or the outsole of shoes, automotive interior materials, home appliances, etc., in order to maximize an aesthetic effect. In particular, various surface shapes, colors, patterns, etc. have recently been applied using methods such as painting, plating, hydrographic printing, insert molding, etc. to satisfy desires of customers.

However, although the methods such as painting, plating, hydrographic printing, insert molding, etc. in the related art can implement various colors, they have disadvantages in that they have limitations in expressing patterns, the processes are complicated, and the production costs are high.

In order to solve this problem, a method of forming a 3D pattern has been disclosed in Korean Patent No. 10-1080765, the method being characterized by generating a magnetic field by applying a current to an electromagnet installed at a mold facing a pattern surface of a finished product simultaneously with injecting a raw material, which is produced by a magnetic pigment and a hardener into plastic resin at a predetermined composition ratio, to form a predetermined 3D pattern of the magnetic pigment in the raw material arranged along the shape of the magnetic field (magnetic field lines), and characterized by obtaining a completely hardened finished product by cooling the product in a mold before opening the mold.

However, this method of forming a 3D pattern has problems in that the manufacturing cost is high because a large amount of magnetic pigment should be included in a raw material of a product, a lot of cost and effort are required to manufacture and maintain a mold because an electromagnet should be installed at an injection mold, and workers cannot freely change patterns.

SUMMARY

The present disclosure has been made in an effort to solve the problems in the related art and an objective of the present disclosure is to provide an apparatus for forming a magnetic pigment pattern on an article, the apparatus being able to form a desired pattern by spraying a resin composite mixed with a magnetic pigment onto the surface of an article and then arranging the magnetic pigment along predetermined magnetic field lines, being easily manufactured, being economical, and easily changing patterns to be formed on an article; and a method for forming a magnetic pigment pattern using the apparatus.

In order to achieve the objectives, an apparatus for forming a magnetic pigment pattern on an article according to the present disclosure includes: a magnetic pattern mold having nonmagnetic pattern grooves engraved in a predetermined pattern, and providing predetermined magnetic field lines on a pattern-forming object surface of an article by generating magnetism in areas outside the nonmagnetic pattern grooves; and a spray unit spraying an adhesive resin composite containing a ferromagnetic pigment onto the pattern-forming object surface of the article, wherein a predetermined magnetic pigment pattern is formed while the magnetic pigment of the adhesive resin composite that is applied to the pattern-forming object surface of the article is rearranged along magnetic field lines generated by the magnetic pattern mold.

The apparatus for forming a magnetic pigment pattern on an article of the present disclosure may further include a supporting plate made of a weak magnetic or nonmagnetic material and stacked on one surface of both surfaces of the magnetic pattern mold.

The supporting plate may be formed in a mesh type.

The magnetic pattern mold may be made of an elastic magnet magnetized with an N pole and an S pole arranged in a thickness direction of the magnetic pattern mold.

The magnetic pattern mold may be magnetized with an N pole and an S pole arranged in the thickness direction by alternately stacking up and down a plurality of magnetic films made of an elastic material having the polarity of an N pole and a plurality of magnetic films made of an elastic material having the polarity of an S pole.

A nonmagnetic pattern of the magnetic pattern mold may be filled with a filler made of nonmagnetic resin.

The magnetic pattern mold may be detachably stacked on a bottom of the article while elastically deforming in a shape corresponding to the bottom of the article, and a separable adhesive may be applied between a top of the magnetic pattern mold and the bottom of the article so that the magnetic pattern mold is temporarily bonded to the bottom of the article, and may be separated from the article when a process of forming a magnetic pigment pattern is performed.

In this case, the apparatus for forming a magnetic pigment pattern on an article may further include a supporting plate made of a weak magnetic or nonmagnetic material in a mesh type and stacked on one surface of both surfaces of the magnetic pattern mold.

The magnetic pattern mold may be installed at a predetermined distance from the pattern-forming object surface of the article, and the spray unit may apply an adhesive resin composite to the pattern-forming object surface of the article by spraying the adhesive containing a ferromagnetic pigment to a space between the pattern-forming object surface of the article and the magnetic pattern mold.

The spray unit may include a plurality of spray nozzles spraying an adhesive resin composite toward the pattern-forming object surface of the article through the nonmagnetic pattern grooves of the magnetic pattern mold.

The apparatus for forming a magnetic pigment pattern on an article may further include a protective film made of a nonmagnetic material and detachably attached to a surface, which faces the pattern-forming object surface of the article, of surfaces of the magnetic pattern mold.

A method of forming a pattern on a surface of an article using the apparatus for forming a magnetic pigment pattern on an article of the present disclosure having the configuration described above includes: stacking an article on a magnetic pattern mold or disposing the article at a predetermined distance from the magnetic pattern mold (S1); and applying an adhesive resin composite to a pattern-forming object surface of the article by spraying the adhesive resin composite containing a ferromagnetic pigment onto the pattern-forming object surface of the article (S2), in which the magnetic pigment of the adhesive resin composite forms a magnetic pigment pattern on the pattern-forming object surface of the article while being arranged along magnetic field lines of the magnetic pattern mold in the step (S2).

Coating a base layer made of paint having a predetermined color on the pattern-forming object surface of the article may be performed before the step (S1) is performed.

Multiple resin pattern layers each having a magnetic pigment pattern may be formed on the pattern-forming object surface of the article by sequentially repeating twice or more the step (S1) and the step (S2).

The adhesive resin composite may be hardened by applying heat or emitting ultraviolet light to the article when the step (S2) is performed.

According to the present disclosure, an article is stacked on the magnetic pattern mold generating magnetic field lines in a predetermined pattern and paint produced by mixing a ferromagnetic pigment in adhesive resin is sprayed onto the surface of the article, whereby a desired pattern can be easily formed on the surface of the article while the magnetic pigment in the adhesive resin is rearranged along the magnetic field lines of the magnetic pattern mold.

Accordingly, it is possible to rearrange and coat a magnetic pigment in a desired pattern shape on the article, so it is possible to easily and freely form not only simple patterns or designs, but patterns that give a 3D optical illusion effect.

In particular, since the magnetic pattern mold is manufactured using a flexible and elastic material and magnetic field lines are formed in areas outside the nonmagnetic pattern by engraving the nonmagnetic pattern in a groove or through-hole type in the magnetic pattern mold, there is an advantage that it is possible to magnetic field lines in desired patterns and it is very easy to manufacture a magnetic pattern mold having a shape corresponding to a 3D shape of an article.

Further, when it is required to change a pattern or a design to be formed on the surface of an article, it is possible to simply change the shape of the pattern by replacing the magnetic pattern mold, so it is also possible to easily change a pattern.

Further, since a pattern is formed on the surface of an article while adhesive resin mixed with a magnetic pigment is coated, it is possible to achieve an effect of increasing mechanical strength in comparison to articles having a pattern expressed directly thereon in the related art.

When a magnetic pattern mold is made of a magnet magnetized with an N pole and an S pole arranged in an up-down direction by alternately stacking up and down a plurality of magnetic films made of an elastic material having the polarity of an N pole and a plurality of magnetic films made of an elastic material having the polarity of an S pole, an unintended straightly striped pattern is not formed when a magnetic pigment is rearranged along magnetic field lines.

DETAILED DESCRIPTION

Figure 1:
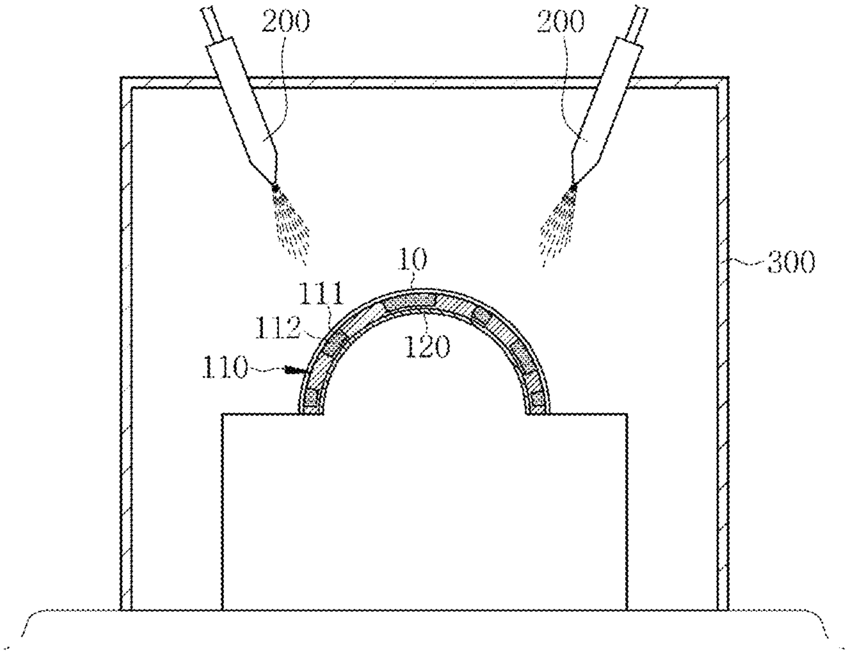
FIG. 1 is a cross-sectional view showing the configuration of an apparatus for forming a magnetic pigment pattern on an article according to a first embodiment of the present disclosure.

Embodiments described in the specification and the configurations shown in drawings are only preferred embodiments of the present disclosure and there may be various modified examples that can replace the embodiments and drawings of the specification at the point in time of this application.

Hereafter, an apparatus for forming a magnetic pigment pattern on an article and a method for forming a magnetic pigment pattern on an article using the apparatus are described through embodiments to be described below in detail with reference to the accompanying drawings. The same reference numerals indicate the same components in the drawings.

Referring to FIG. 1, an apparatus for forming a magnetic pigment pattern on an article according to an embodiment of the present disclosure includes a magnetic pattern mold 110 having a shape corresponding to the shape of an article 10 and formed to generate magnetic field lines in a predetermined pattern, a supporting plate 120 stacked on any one of the top and the bottom or on both the top and the bottom of the magnetic pattern mold 110 and supporting the magnetic pattern mold 110, and a spray unit 200 spraying an adhesive resin composite mixed with a magnetic pigment to the article 10 stacked on the magnetic pattern mold 110.

Figure 3:
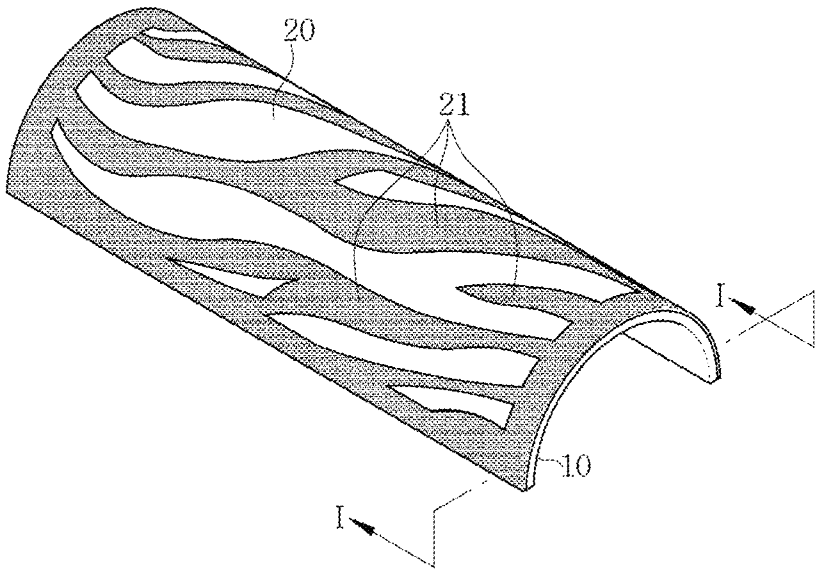
FIG. 3 is a perspective view showing an example of an article having a magnetic pigment pattern formed by the apparatus for forming a magnetic pigment pattern on an article according to the first embodiment of the present disclosure.
Figure 4:
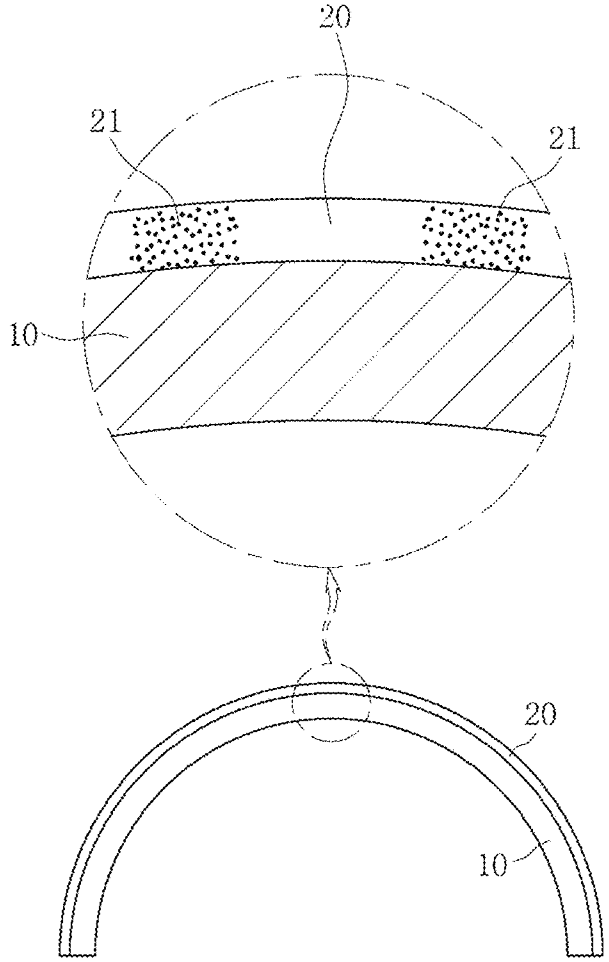
FIG. 4 is a cross-sectional view taken along line I-I of FIG. 3.

The adhesive resin composite that is sprayed from the spray unit 200 is a composite produced by mixing a magnetic pigment having ferromagnetism in resin, and the magnetic pigment in the adhesive resin composite sprayed from the spray unit 200 is rearranged along magnetic field lines of the magnetic pattern mold 110, whereby, as shown in FIGS. 3 and 4, a predetermined pattern is formed on the surface of the article 10 by the magnetic pigment.

When the coating object article 10 has a 3D shape, the magnetic pattern mold 110 may be formed in advance to have a 3D shape corresponding to the shape of the coating object article 10 and then stacked with the article 10 in a coating process. For example, when the article 10 has a semi-cylindrical shape, as in this embodiment, the magnetic pattern mold 110 may also be formed to have a semi-cylindrical shape. Further, when the article has a flat plate or curved plate shape with both curved sides or a polygonal case shape, the magnetic pattern mold 110 may have a shape corresponding to the inner side of the article 10 to be able to be stacked in close contact with the inner side of the article 10.

The magnetic pattern mold 110 serves to rearrange a magnetic pigment in an adhesive resin composite into a predetermined pattern using magnetism by forming magnetic field lines in a pattern corresponding to a pattern to be formed on an article. The magnetic pattern mold 110 may be made of a magnet having magnetism and has nonmagnetic pattern grooves 111 engraved in a pattern opposite to a desired pattern for forming magnetic field lines into a predetermined desired pattern, that is, in a pattern opposite to a pattern to be formed on the article 10, whereby magnetic field lines are formed in areas outside the nonmagnetic pattern grooves 111. The insides of the nonmagnetic pattern grooves 111 engraved like grooves or holes in the magnetic pattern mold 110 may be filled with a filler 112 made of nonmagnetic resin. As the filler 112 that fills the insides of the nonmagnetic pattern grooves 111, silicone having excellent heat resistance and stability may be applied, but other various types of heat resistant resin may be used. The filler 112 increases strength of the magnetic pattern mold 110 in the nonmagnetic pattern grooves 111 and enables a pattern to be maintained even if a disconnected portion is formed in the areas outside the nonmagnetic pattern grooves 111.

The magnetic pattern mold 110 may be a magnet made of an elastic material such as rubber, and may be preferably magnetized with N and S poles arranged in an up-down direction (thickness direction) to form a predetermined pattern on the article 10. When the magnetic pattern mold 110 is magnetized with N and S poles arranged in a left-right direction (width direction or longitudinal direction), a magnetic pigment in an adhesive resin composite may not be accurately arranged in an intended pattern and an unintended stripe pattern may be formed on the article 10. However, when the magnetic pattern mold 110 is magnetized with N and S poles arranged in the up-down direction, it is possible to prevent generation of such an unintended stripe pattern.

Figure 6:
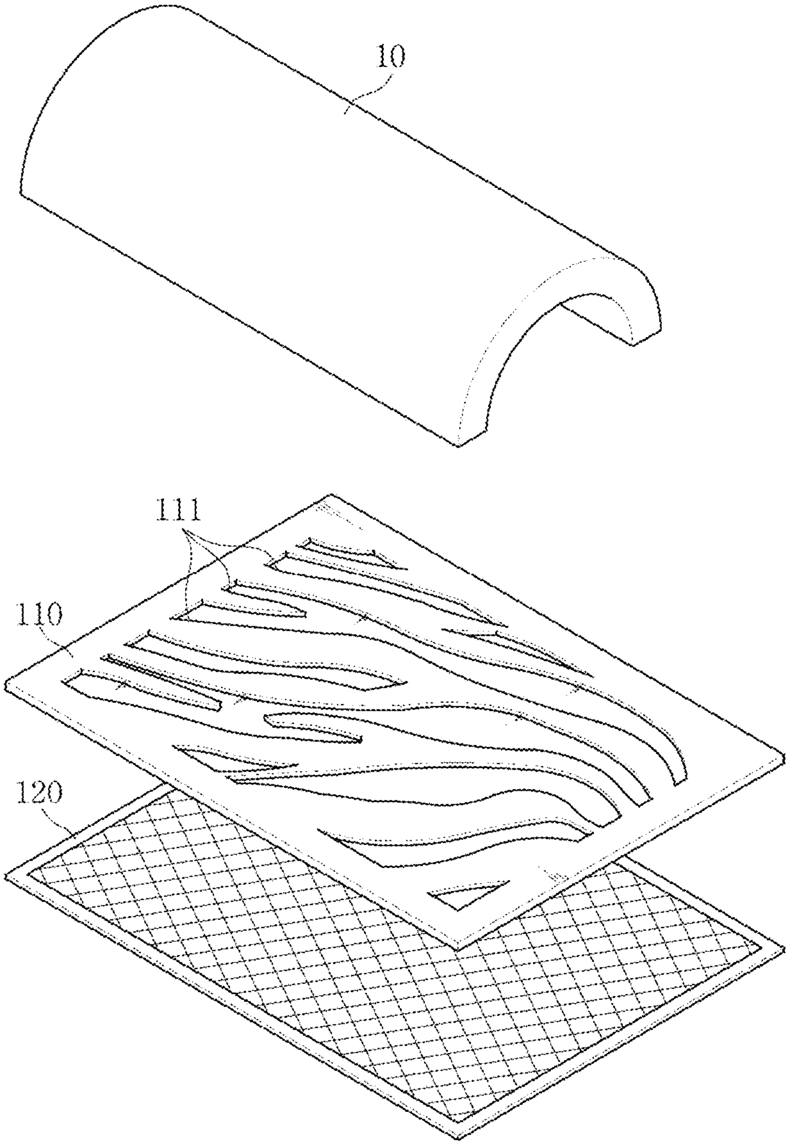
FIG. 6 is an exploded perspective view of a magnetic pattern mold constituting an apparatus for forming a magnetic pigment pattern on an article according to a second embodiment of the present disclosure.

As shown in FIG. 6, the magnetic pattern mold 110 may be manufactured into a flat plate-shaped magnetic mold magnetized with N and S poles arranged in the up-down direction by alternately stacking up and down a plurality of magnetic films 100*a* made of an elastic material having the polarity of an N pole and a plurality of magnetic films 110*b* made of an elastic member having the polarity of an S pole, and then formed to have a 3D shape corresponding to the shape of the article 10 together with the supporting plate 120 in a press to be used.

The supporting plate 120 is stacked on any one of the top and the bottom or on both the top and the bottom of the magnetic pattern mold 110, as described above, and serves to maintain the shape of the magnetic pattern mold 110 while a pattern is formed, by reinforcing the strength of the magnetic pattern mold 110 made of an elastic material. The supporting plate 120 has a small thickness not to interfere with influence on a magnetic pigment by the magnetism of the magnetic pattern mold 110 and may be a flat plate made of metal having very weak magnetism such as aluminum, a weak magnetic material such as high heat resistant plastic, or a nonmagnetic material.

Alternatively, the supporting plate 120 may be formed in a mesh type to be able to be formed while being easily deformed in a shape corresponding to the shape of the article 10 together with the magnetic pattern mold 110.

Figure 2A:
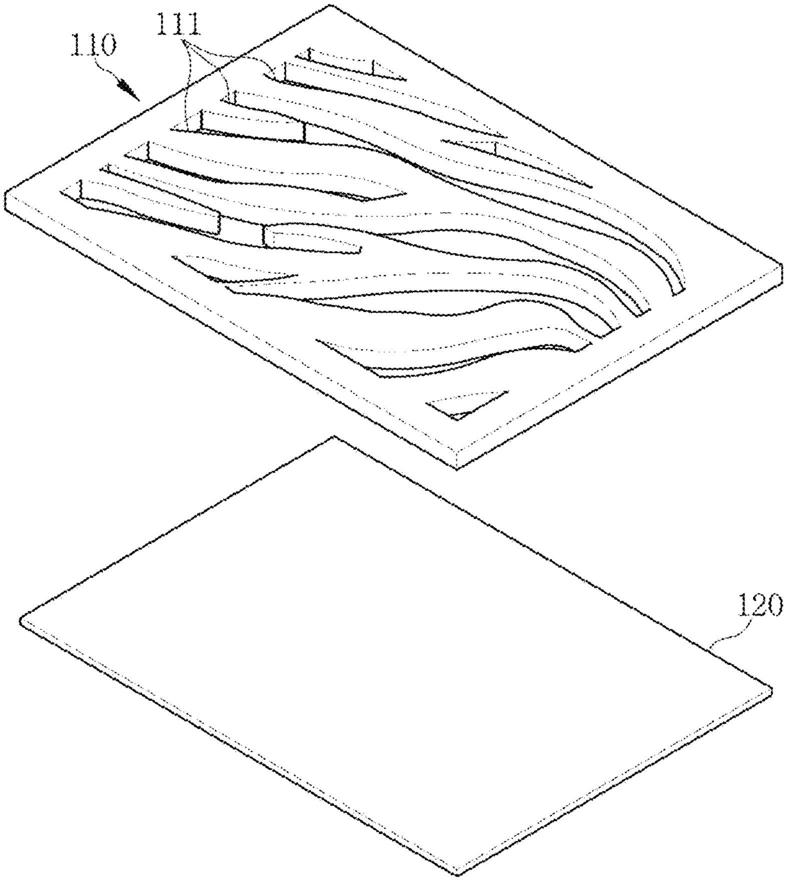
FIG. 2A is a perspective view showing the state before forming of a magnetic pattern mold constituting the apparatus for forming a magnetic pigment pattern according to the first embodiment of the present disclosure before forming.
Figure 2B:
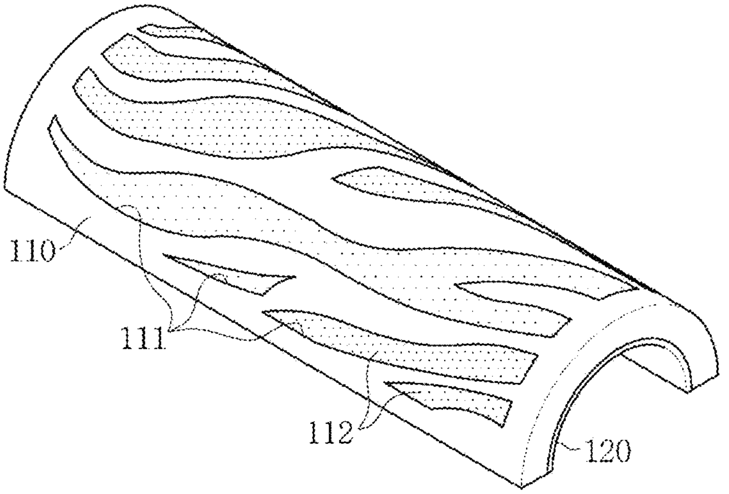
FIG. 2B is a perspective view showing the state after forming of the magnetic pattern mold shown in FIG. 2A.

Referring to FIGS. 2A and 2B, the supporting plate 120 may be placed on the magnetic pattern mold 110 before a coating process and then bonded while being formed in a 3D shape corresponding to the article 10 together with the magnetic pattern mold 110 by a well-known press or forming machine. Alternatively, the supporting plate 120 may be formed in a shape corresponding to the article 10 separately from the magnetic pattern mold 110 and then bonded to a surface of the magnetic pattern mold 110.

The bonded assembly of the magnetic pattern mold 110 and the supporting plate 120 may be disposed in a process chamber 300. At least one or more spray units 200 that spray an adhesive resin composite to the surface of the article 10 may be installed at the top of the process chamber 300. The spray unit 200 coats the surface of the article 10 with an adhesive resin composite by spraying the adhesive resin composite at a predetermined spray pressure. It is preferable that the spray pressure of the spray unit 200 is 4 to 10 kg/cd in order to form a uniform coating layer, and a uniform coating layer and rearrangement of a magnetic pigment can be more accurately achieved as intended particularly in the range of 7 to 8 kg/cd. Spraying by the spray unit 200 may be automatically controlled by an automated device, but it is unlikely, and it may be manually controlled by a person.

The adhesive resin composite that is sprayed through the spray unit 200 is coated on the surface of the article 10, thereby forming a resin pattern layer 20. In this case, the magnetic pigment contained in the adhesive resin composite is arranged along magnetic field lines generated in the areas outside the nonmagnetic pattern grooves 11 of the magnetic pattern mold 110, thereby forming a pattern corresponding to the magnetic field lines.

It was seen that when the magnetic pattern mold 110 is magnetized with N and S poles arranged in the up-down direction, an unintended striped pattern is not formed while a pattern is formed by rearrangement of the magnetic pigment in the resin pattern layer 20.

Meanwhile, a heater that discharges heat into the process chamber 300 or an ultraviolet light source that emits ultraviolet light into the process chamber 300 may be additionally installed so that an adhesive resin composite can be quickly hardened after being sprayed onto the surface of the article 10 from the spray unit 200.

The adhesive resin composite that is sprayed from the spray unit 200 has excellent adhesive strength to the surface of the article 10 that is made of various materials and has viscosity suitable such that it can be sprayed, and may be produced by mixing a wetting and dispersing agent, a defoaming agent, a hardener, and a magnetic pigment in any one selected from a group of epoxy resin, polyurethane resin, and acryl resin. The resin may include an agent of 50~65% by weight, a fluidity adjusting agent 0.1~0.5% by weight, a wetting and dispersing agent of 0.5~1.5% by weight, a defoaming agent of 0.5 to 1.5% by weight, a hardener 10~20% by weight, and the balance of a magnetic pigment.

The epoxy resin is a polymer having epoxy bonding as a chemical unit of a constituent molecule and there are a bisphenol A type, a bisphenol F type, a novolac type, etc. First, the bisphenol A type is the most common epoxy resin produced by polymerizing epichlorohydrin and bisphenol A and has an advantage of excellent adhesion because hydrophilic hydroxyl groups and hydrophobic hydrocarbon groups are regularly arranged in a molecular structure. However, there is a problem that since several benzene nucleuses are included, free rotation is difficult and phenolic contents that are a kind of endocrine-disrupting substances are discharged. Accordingly, in the present disclosure, bisphenol F type epoxy resin is used, and in the bisphenol F type epoxy resin, CH3 at the center of a bisphenol A type molecule is substituted by hydrogen (H), so there is an advantage that viscosity is low in comparison to the bisphenol A type, compatibility with other resin is excellent, and particularly, it does not discharge endocrine-disrupting substances. It is preferable that the bisphenol F type epoxy resin is contained at 50-65% by weight. When it is less than 50% by weight, crosslink density of a coating layer decreases and properties thereof are deteriorated, and when it exceeds 65% by weight, it is difficult to secure an appropriate thickness of a coating layer due to a problem with fluidity of a composite, so workability is deteriorated.

As the fluidity adjusting agent, any one of fumed silica, urea resin, polyamide wax, and bentonite may be used. It is preferable that the fluidity adjusting agent is contained at 0.1 to 0.5% by weight. When it is less than 0.1% by weight, fluidity is high, so vertical flow is generated, and when it exceeds 0.5% by weight, properties are deteriorated due to excessive prescription, which is not preferable.

It is preferable that the content of the wetting and dispersing agent and the defoaming agent is 0.5~1.5% by weight and 0.5 to 1.5% by weight, respectively, but when the content of the dispersing agent is low, a magnetic pigment is not dispersed well, and when it is excessive, properties of resin are deteriorated. When the content of the defoaming agent is deficient, generation of bubbles is not suppressed, and the content of the defoaming agent is excessive, properties may be deteriorated.

As the hardener, one kind selected from a group of polyamide, aliphatic amine, and cycloaliphatic amine may be used to be suitable for the bisphenol F type epoxy resin. It is preferable that the hardener is contained at 10~20% by weight. When the content of the hardener is less than 10% by weight, adhesion decreases, and when it exceeds 20% by weight, it is difficult to spray resin due to variation of a viscosity, so there is a problem that workability is deteriorated.

The magnetic pigment is ferromagnetic powder, so when the magnetic pigment is sprayed on the article 10, it forms a predetermined pattern while being rearranged in a resin pattern layer by the magnetism generated in areas outside the nonmagnetic pattern grooves 111 of the magnetic pattern mold 110 stacked on the article 10. The magnetic pigment includes ferromagnetic metal such as steel, manganese, cobalt, nickel, and chromium dioxide, and is a pigment particle having a predetermined color such as green, blue, and red, and a magnetic pigment such as a well-known metal pigment is used.

A method of forming a magnetic pigment pattern 21 on an article 10 using the apparatus for forming a magnetic pigment pattern that has the configuration described above is as follows.

A bonded assembly of the magnetic pattern mold 110 and the supporting plate 120 is installed in the process chamber and an article 10 is stacked on the magnetic pattern mold 110. When an adhesive resin composite is sprayed and applied to the surface of the article 10 from the spray unit 200, a predetermined pattern is formed by the magnetic pigment on the surface of the article 10 while the magnetic pigment in the adhesive resin composite is arranged along magnetic field lines generated outside the nonmagnetic pattern grooves 111 of the magnetic pattern mold 110.

In this case, the adhesive resin composite is quickly hardened by applying high-temperature heat or emitting ultraviolet light into the process chamber 300 such that a resin pattern layer 20 can be coated on the surface of the article 10 by the adhesive resin composite and the shape of the pattern can be maintained.

Figure 7:
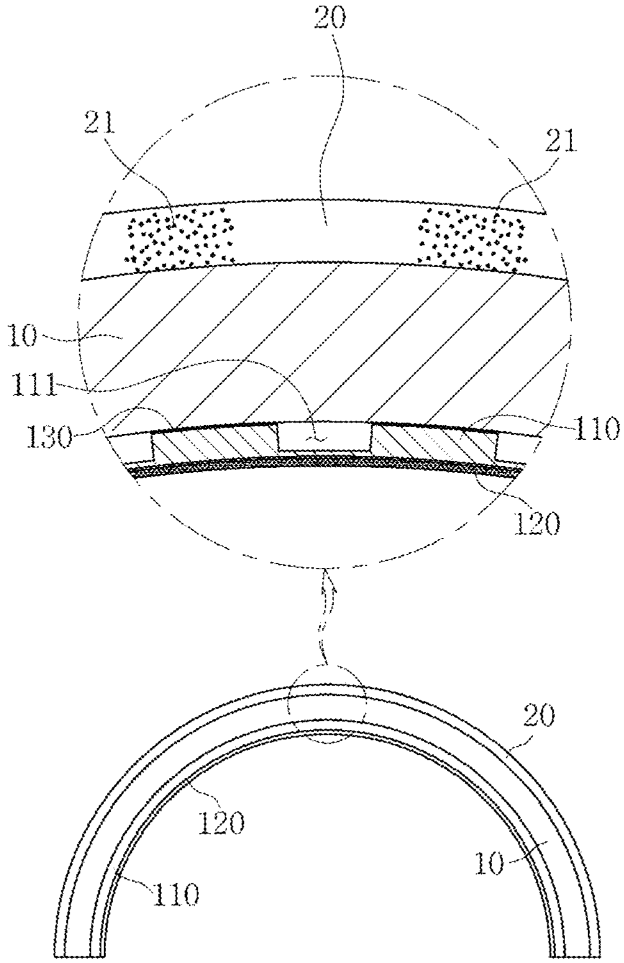
FIG. 7 is a cross-sectional view showing the apparatus for forming a magnetic pigment pattern on an article shown in FIG. 6.
Figure 8:
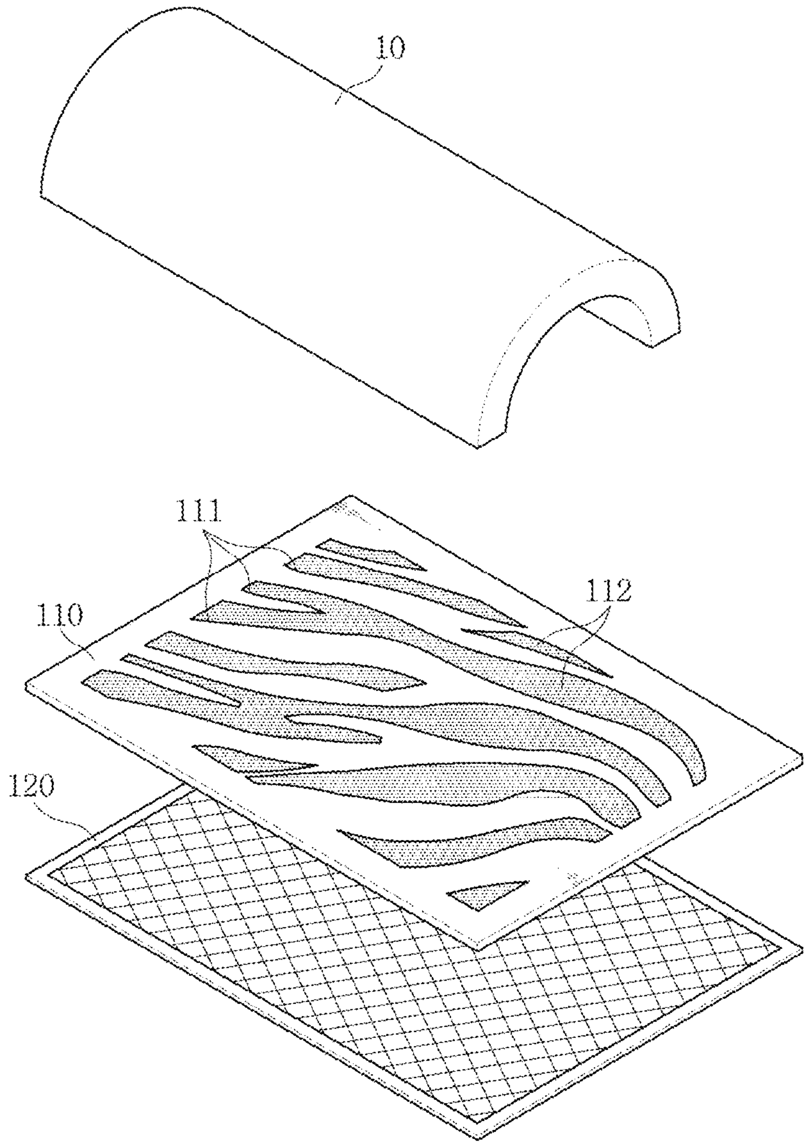
FIG. 8 is an exploded perspective view showing a modified example of the apparatus for forming a magnetic pigment pattern on an article shown in FIG. 6.

In the apparatus for forming a magnetic pigment pattern 21 according to the embodiment described above, the magnetic pattern mold 110 and the supporting plate 120 are formed in advance in a shape corresponding to the shape of an pattern-forming object article 10 and then stacked on the article 10, and provide magnetic field lines. However, as shown in FIGS. 6 to 8, the magnetic pattern mold 110 may be manufactured in a thin and elastic magnetic plate shape and maintained in a flat plate shape before it is stacked on an article 10, and then may be stacked on the bottom of the article 10 while being deformed in a shape corresponding to the bottom of the article 10 to provide magnetic field lines for forming a pattern on the bottom of the article 10.

In this case, the supporting plate 120 may be formed in a thin mesh type so that it can be easily elastically deformed into the shape corresponding to the article 10 together with the magnetic pattern mold 110, and can be easily restored while being elastically deformed into the initial flat plate shape after separated from the article 10.

When the magnetic pattern mold 110 is stacked on the bottom of the article 10, the magnetic pattern mold 110 is temporarily bonded to the bottom of the article 10 by applying a separable adhesive 130 between the top of the magnetic pattern mold 110 and the bottom of the article 10, whereby it is possible to stably keep the article 10 and the magnetic pattern mold 110 fixed to each other.

As the separable adhesive 130 for easily bonding and then separating the magnetic pattern mold 110 to and from the bottom of the article 10, a well-known separable adhesive or separable gluing agent that is used for temporarily bonding rubber, resin, plastic, etc. may be used. It is preferable use a separable adhesive 130 that can stably maintain a bonded state when the magnetic pattern mold 110 is temporarily bonded to the bottom of the article 10, and that does not leave adhesive remains on the bottom of the article 10 after the magnetic pattern mold 110 is separated from the article 10.

The bonded assembly of the thin plate-shaped magnetic pattern mold 110 and the supporting plate 120 may be temporarily bonded to the opposite surface to the surface of an article on which a pattern is formed by the separable adhesive 130 and then may be placed in the process chamber 300.

FIGS. 3 and 4 show an example in which a pattern has been formed on a semi-cylindrical article 10 using the apparatus for forming a magnetic pigment pattern according to the embodiment described above, but besides the semi-cylindrical article, the magnetic pigment pattern 21 may be formed on the surface of articles such as interior products and the interior materials of vehicles, airplanes, ships, etc. that have various 3D shapes such as a flat plate or a curved plate having both curved sides, a polygonal plate, etc.

Figure 9:
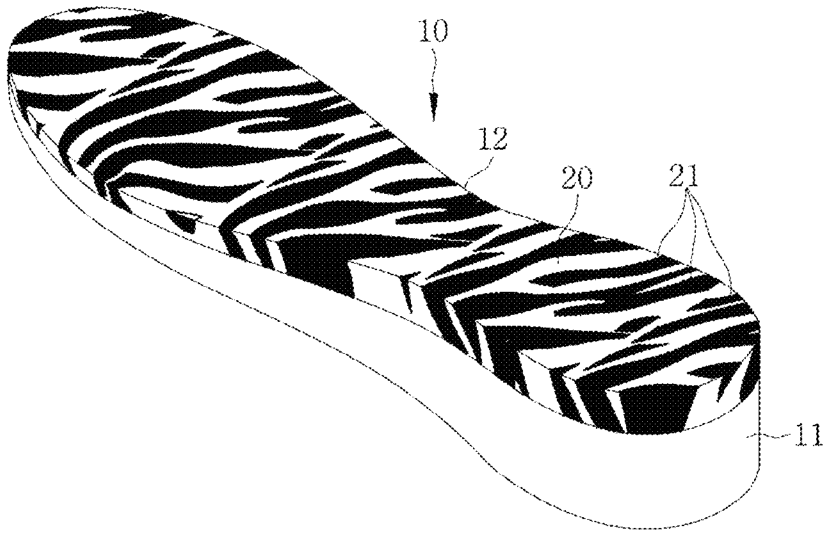
FIG. 9 is a perspective view showing another example of an article having a magnetic pigment pattern formed by an apparatus for forming a magnetic pigment pattern on an article according to the present disclosure.
Figure 10:
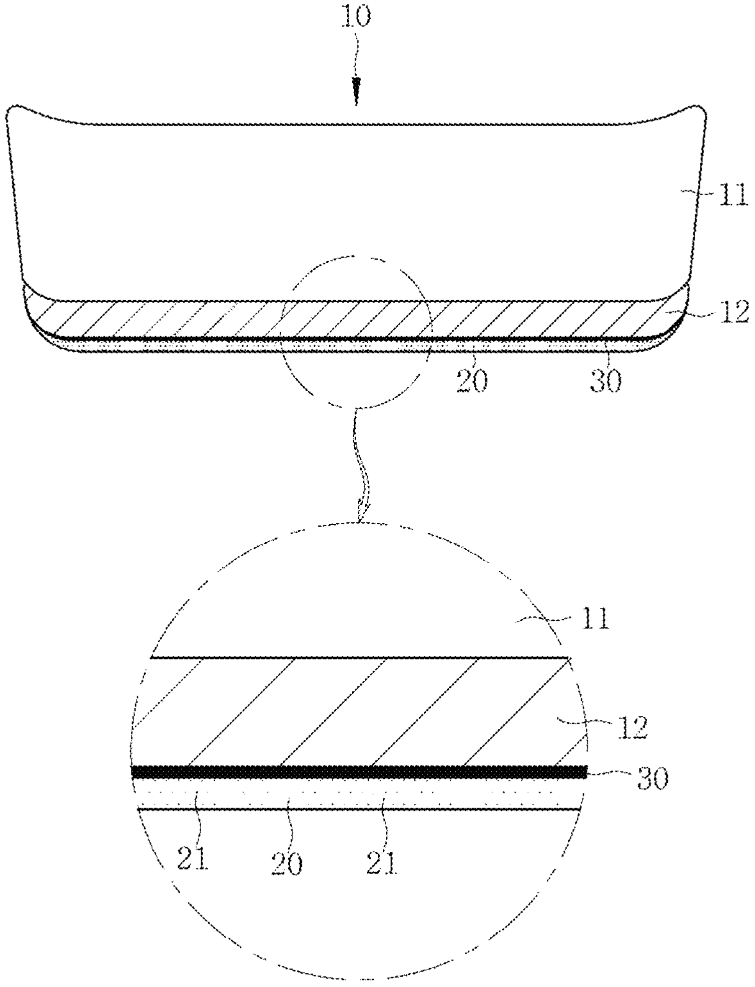
FIG. 10 is a cross-sectional view of the article shown in FIG. 9.
Figure 11:
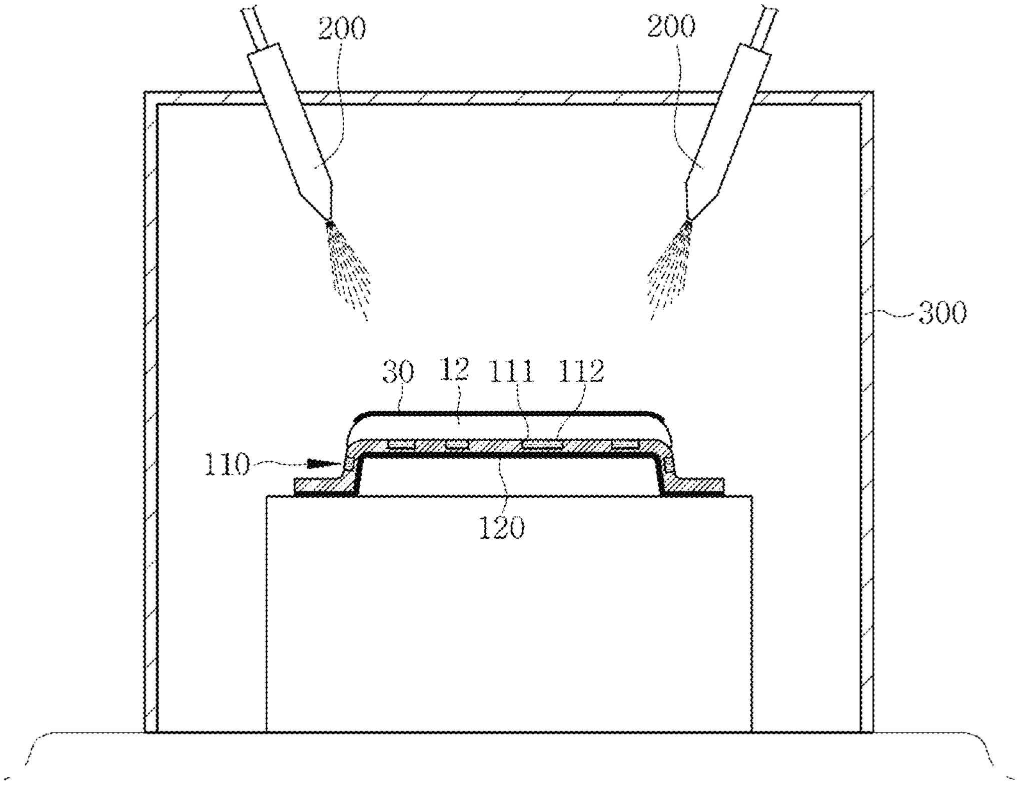
FIG. 11 is a cross-sectional view showing an apparatus for forming a magnetic pigment pattern on an article according to a third embodiment of the present disclosure for forming the magnetic pigment pattern of the article shown in FIG. 9.
Figure 12:
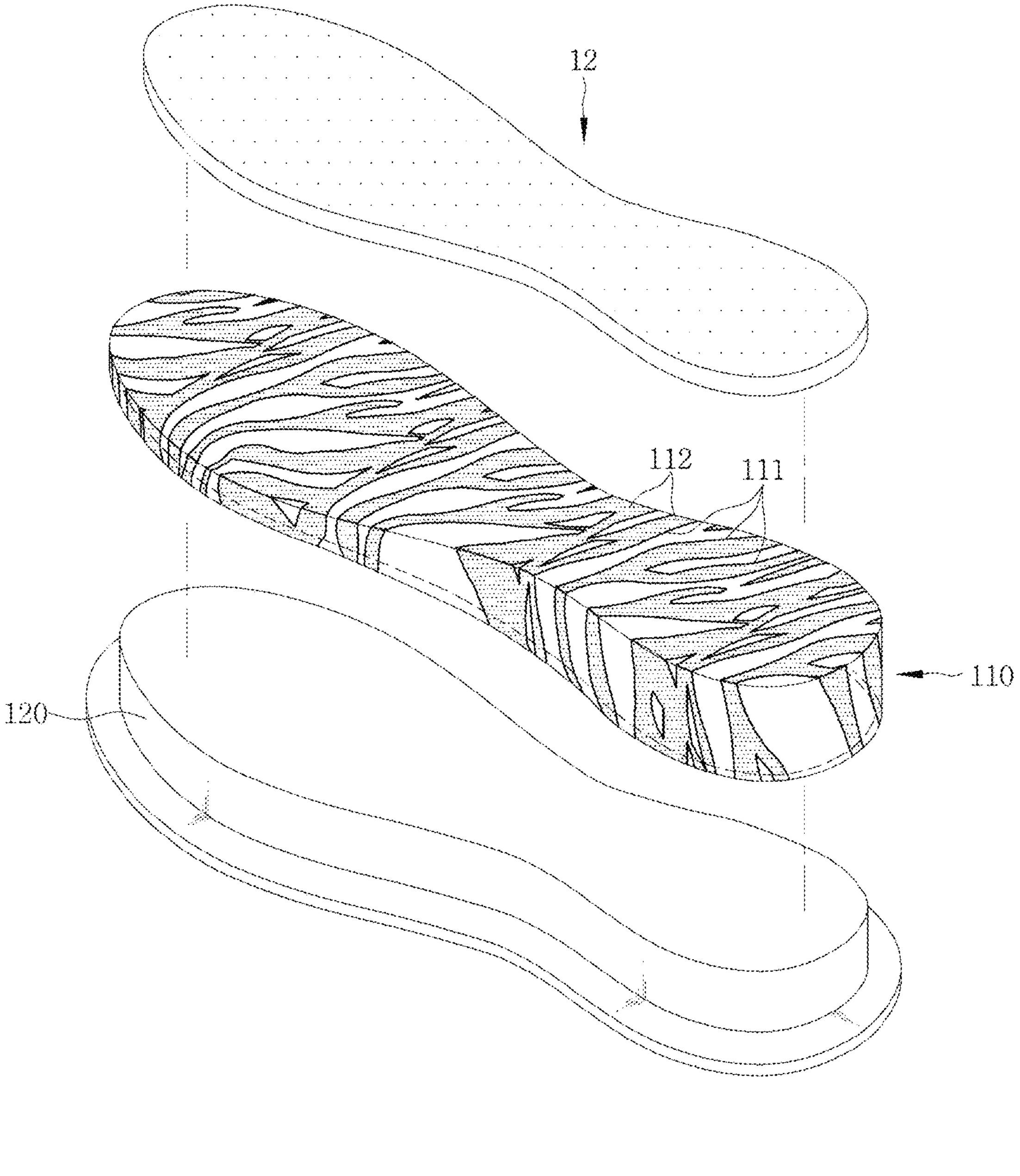
FIG. 12 is an exploded perspective view showing the apparatus for forming a magnetic pigment pattern on an article shown in FIG. 11.
Figure 13:
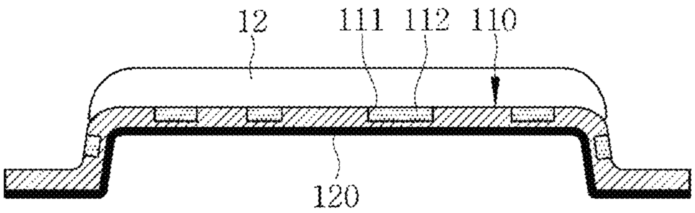
FIG. 13 is a cross-sectional view of the apparatus for forming a magnetic pigment pattern on an article shown in FIG. 11.

FIGS. 9 and 10 show an outsole of a shoe as a pattern-forming object article 10, and FIGS. 11 to 13 show an apparatus for forming a magnetic pigment pattern that forms the magnetic pigment pattern 21 on the outer surface of an outsole of a shoe.

The apparatus for forming a magnetic pigment pattern in this embodiment, similar to the apparatus for forming a magnetic pigment pattern in the embodiment described above, includes a magnetic pattern mold 110 and a supporting plate 120 that have a shape corresponding to the shape of an article 10, that is, an outsole of a shoe. The magnetic pattern mold 110 has nonmagnetic pattern grooves 11 formed in an opposite pattern to the pattern that is formed on an outsole of a shoe and is configured such that magnetic field lines are generated in areas outside the nonmagnetic pattern grooves 11. The configuration and operation of the magnetic pattern mold 110 and the supporting plate 120 are the same as or similar to the configuration and operation of the magnetic pattern mold 110 and the supporting plate 120 in the embodiment described above, so they are not described in detail.

In order to form a resin pattern layer 20 and a magnetic pigment pattern 21 by spraying an adhesive resin composite onto the surface of an article 10 such as an outsole of a shoe, the outer surface of the article 10 is coated first with a base layer 30 using paint having a predetermined color such as black, silver, yellow, white, etc. and then a resin pattern layer 20 is coated on the outer surface of the hardened base layer 30 by spraying the adhesive resin composite described above, whereby the magnetic pigment pattern 21 may be more clearly expressed to the outside and various images combined with the base layer 30 may be implemented.

Oil-based or emulsion paint mixed with a metal color pigment, a changed metal color pigment, which gives a sense of metal, common color pigments, or a pigment giving a pearl luster effect may be used for the base layer 130. The base layer 30 may be coated using well-known painting methods such as spraying paint onto the outer surface of an article 10 or immersing an article in paint.

Figure 14:
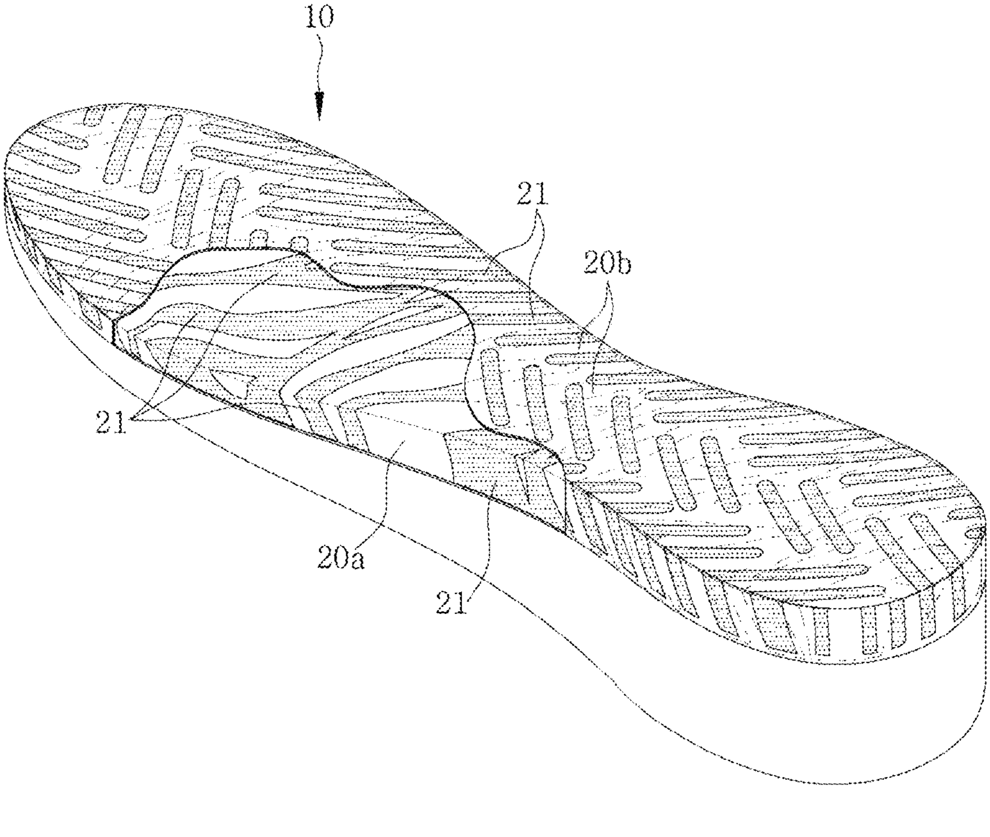
FIG. 14 is a perspective view showing another example of an article having a magnetic pigment pattern formed by an apparatus for forming a magnetic pigment pattern on an article according to the present disclosure.
Figure 15:
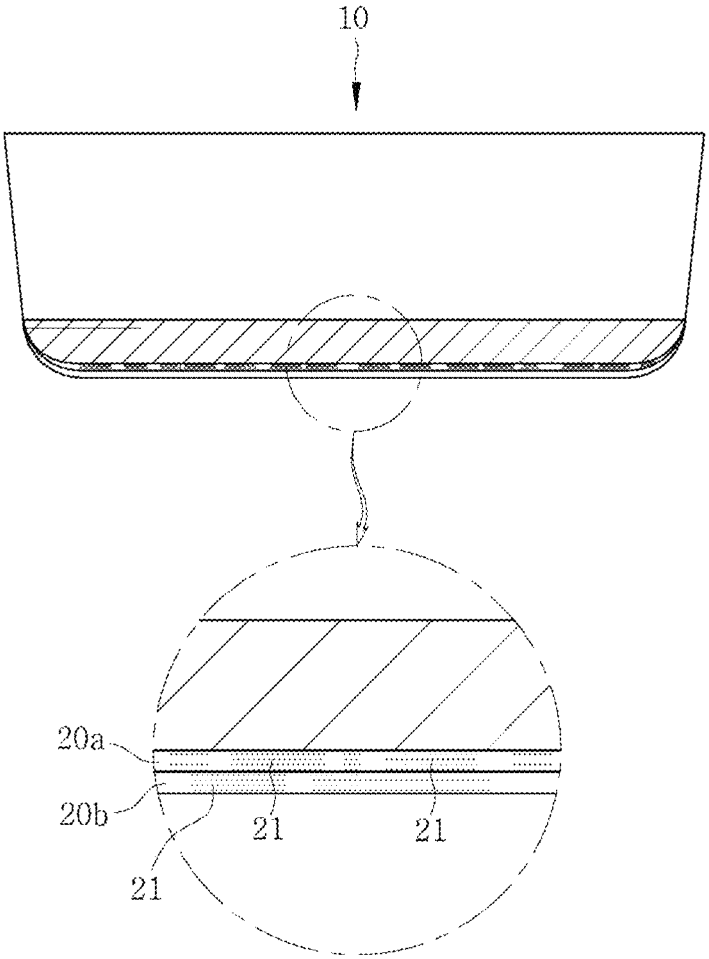
FIG. 15 is a cross-sectional view of the article shown in FIG. 14.

The resin pattern layer 20 that is formed on the surface of the article 10 may be a single layer, but multiple resin pattern layers 20*a* and 20*b* may be formed on the surface of an article 10, as shown in FIGS. 14 to 15, by performing twice or more the process of forming the magnetic pigment pattern 21 described above.

That is, a first magnetic pattern mold 110 that provides magnetic field lines in a predetermined pattern may be stacked on an article 10, a first resin pattern layer 20*a* may be coated by spraying a light-transmissive first adhesive resin composite containing a ferromagnetic pigment onto the surface of the article 10, the article 10 may be stacked on a second magnetic pattern mold 110 that provides magnetic field lines in a predetermined pattern, and then a second resin pattern layer 20*b* may be coated on the first resin pattern layer 20*a* by spraying a light-transmissive second adhesive resin composite containing a ferromagnetic pigment.

The patterns of the first resin pattern layer 20*a* and the second resin pattern layer 20*b* coated on the surface of the article 10 can express various patterns by overlapping each other, depending on the angle at which the article 10 is seen. For example, when the article 10 is seen from the front, the magnetic pigment pattern 21 of the second resin pattern layer 20*b* coated outside is conspicuously seen, and when the article 10 is obliquely seen, the magnetic pigment pattern 21 of the second resin pattern layer 20*b* is conspicuously exposed to the outside and overlaps the magnetic pigment pattern 21 of the first resin pattern layer 20*a*, whereby a new pattern may be expressed.

The nonmagnetic pattern grooves 111 of the first magnetic pattern mold 110 that forms the magnetic pigment pattern 21 of the first resin pattern layer 20*a* and the second magnetic pattern mold 110 that forms the magnetic pigment pattern 21 of the second resin pattern layer 20*b* may be formed in the same shape, but, as shown in FIG. 14, the nonmagnetic pattern grooves 111 of the first magnetic pattern mold 110 and the second magnetic pattern mold 110 may have different types of pattern so that the magnetic pigment pattern 21 of the first resin pattern layer 20*a* and the magnetic pigment pattern 21 of the second resin pattern layer 20*b* form different patterns.

Meanwhile, the apparatuses for forming a magnetic pigment pattern according to the embodiments described above are configured such that an article 10 is stacked on a magnetic pattern mold 110 and the an adhesive resin composite is sprayed onto the article 10 so that a magnetic pigment can be rearranged along magnetic field lines of the magnetic pattern mold 110. However, as shown in FIGS. 16 to 19, it may be possible to coat a resin pattern layer 20 having a magnetic pigment pattern 21 on the surface of an article 10 by disposing a magnetic pattern mold 110, which provides magnetic field lines in a predetermined pattern, outside a pattern-forming object surface of the article 10, and then spraying an adhesive resin composite to the space between the article 10 and the magnetic pattern mold 110.

Figure 16:
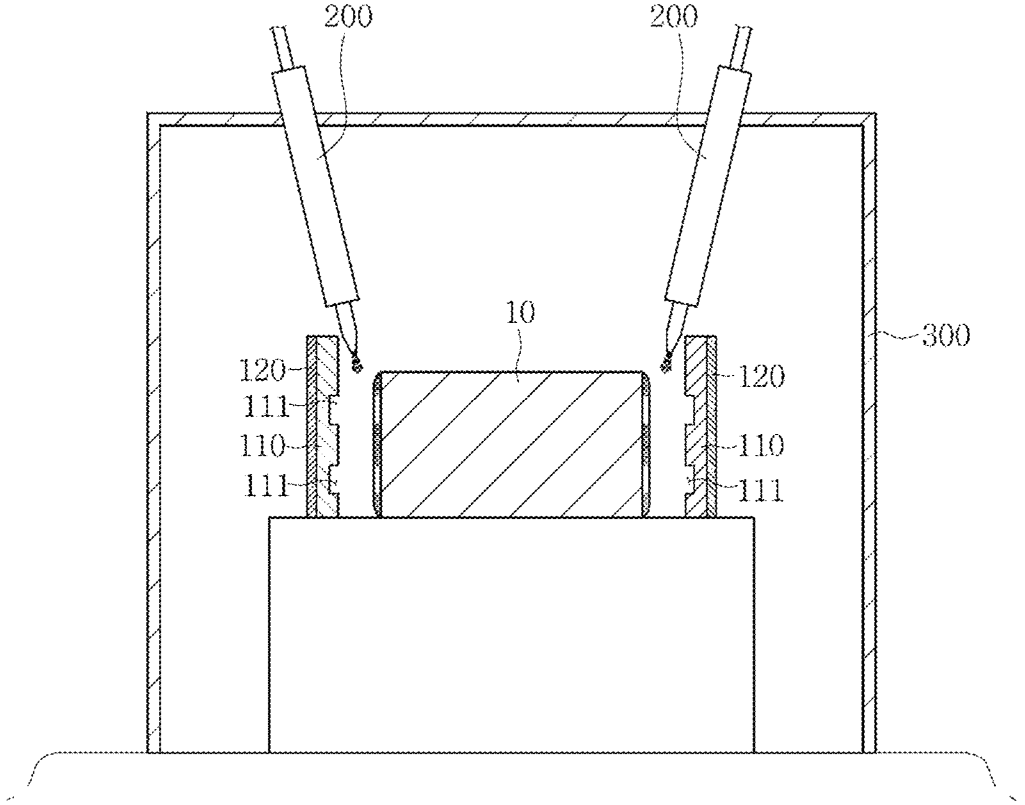
FIG. 16 is a cross-sectional view showing an apparatus for forming a magnetic pigment pattern on an article according to a fourth embodiment of the present disclosure.
Figure 17:
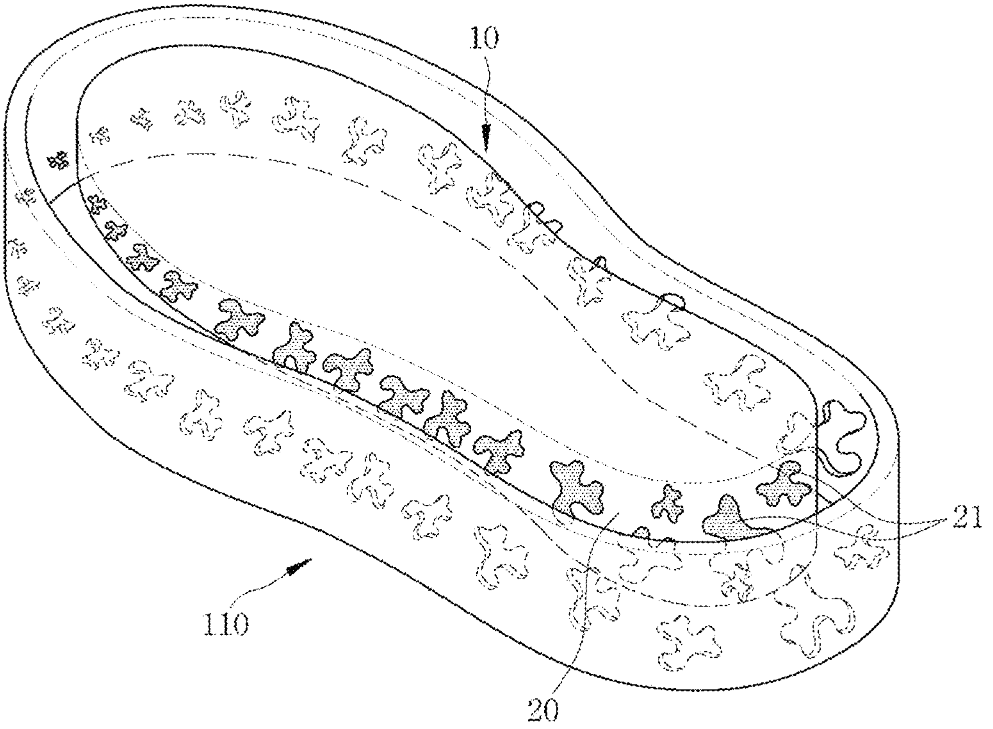
FIG. 17 is a perspective view showing the apparatus for forming a magnetic pigment pattern on an article shown in FIG. 16.
Figure 18:
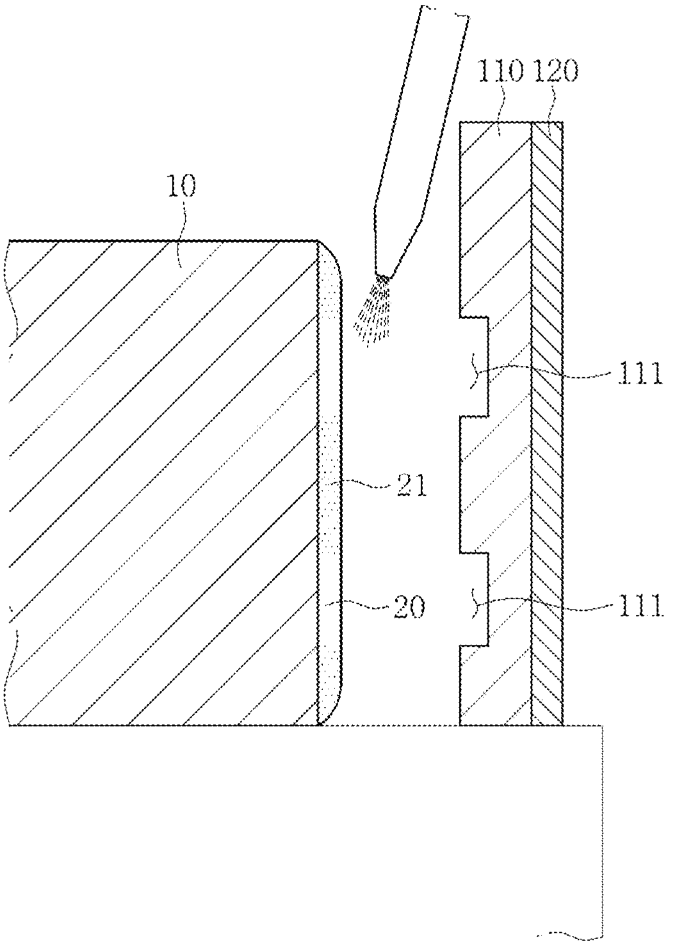
FIG. 18 is a cross-sectional view showing main parts of the apparatus for forming a magnetic pigment pattern on an article shown in FIG. 16.

The embodiment of an apparatus for forming a magnetic pigment pattern shown in FIGS. 16 to 18 includes a magnetic pattern mold 110 that is installed at a predetermined distance from a pattern-forming object surface of an article 10, a weak magnetic or nonmagnetic supporting plate 120 that is stacked on a surface of the magnetic pattern mold 110 and supporting the magnetic pattern mold 110, and a spray unit 200 that applies an adhesive resin composite on the pattern-forming object surface of the article 10 by spraying an adhesive resin composite containing a ferromagnetic pigment into the space between the magnetic pattern mold 110 and the pattern-forming object surface of the article 10.

The magnetic pattern mold 110 is spaced a predetermined distance apart from the pattern-forming object surface of the article 10 and serves to form magnetic field lines in a pattern corresponding to a pattern to be formed on the article such that a magnetic pigment in an adhesive resin composite is rearranged in a predetermined pattern by magnetism.

The magnetic pattern mold 110 itself may be made of a magnet having magnetism and has nonmagnetic pattern grooves 111 engraved in a pattern opposite to a desired pattern for forming magnetic field lines into a predetermined desired pattern, that is, in a pattern opposite to a pattern to be formed on the article 10, whereby magnetic field lines are generated in areas outside the nonmagnetic pattern grooves 111. Similar to the embodiments described above, the nonmagnetic pattern grooves 111 formed in a groove or hole type in the magnetic pattern mold 110 are filled with a filler 112 made of nonmagnetic resin, thereby reinforcing the magnetic pattern mold 110 made of a soft material so that the shape can be stably maintained.

Figure 5:
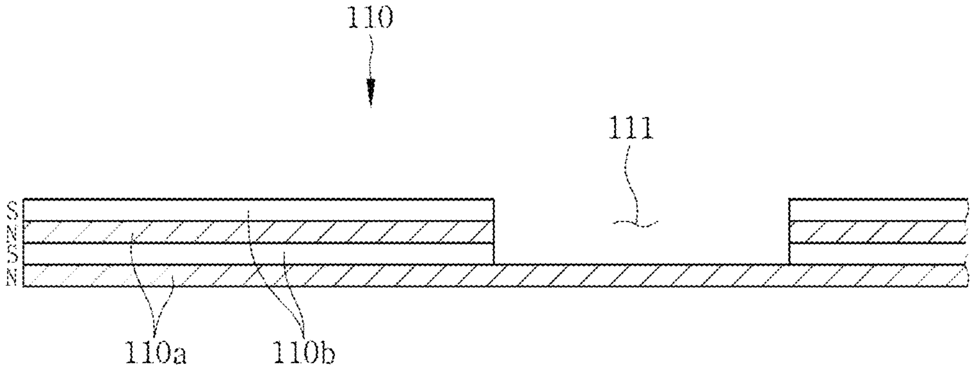
FIG. 5 is a cross-sectional view showing a portion of the magnetic pattern mold constituting the apparatus for forming a magnetic pigment pattern according to the first embodiment of the present disclosure.

The magnetic pattern mold 110 may be a magnet made of an elastic material such as rubber, and may be preferably magnetized with N and S poles arranged in a thickness direction to form a predetermined pattern on the article 10. The magnetic pattern mold 110 magnetized with N and S poles arranged in a thickness direction may be formed, as shown in FIG. 5, by alternately stacking a plurality of magnetic films 110*a* made of an elastic material having the polarity of an N pole and a plurality of magnetic films 110*b* made of an elastic material having the polarity of an S pole.

Figure 19:
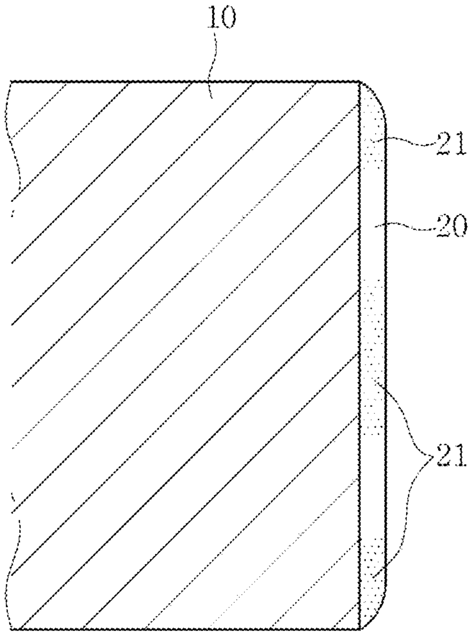
FIG. 19 is a cross-sectional view showing main parts of an article having a magnetic pigment pattern formed by the apparatus for forming a magnetic pigment pattern on an article shown in FIG. 16.

According to an apparatus for forming a magnetic pigment pattern having this configuration, as shown in FIGS. 16 to 18, it is possible to coat a resin pattern layer 20 having a magnetic pigment pattern 21 on the surface of an article 10, as shown in FIG. 19, by installing a magnetic pattern mold 110 in a process chamber 300, placing the article 10 at a predetermined distance from the magnetic pattern mold 110, and then spraying an adhesive resin composite into the space between the article 10 and the magnetic pattern mold 110 using the spray unit 200.

In this case, the magnetic pattern mold 110 may be used without the supporting plate 120, but it may be possible to reinforce and use the magnetic pattern mold 110 by stacking a weak magnetic or nonmagnetic thin supporting plate 120 on an inner surface (surface facing an article) or an outer surface of the magnetic pattern mold 110 or on both the inner surface and the outer surface.

Figure 20:
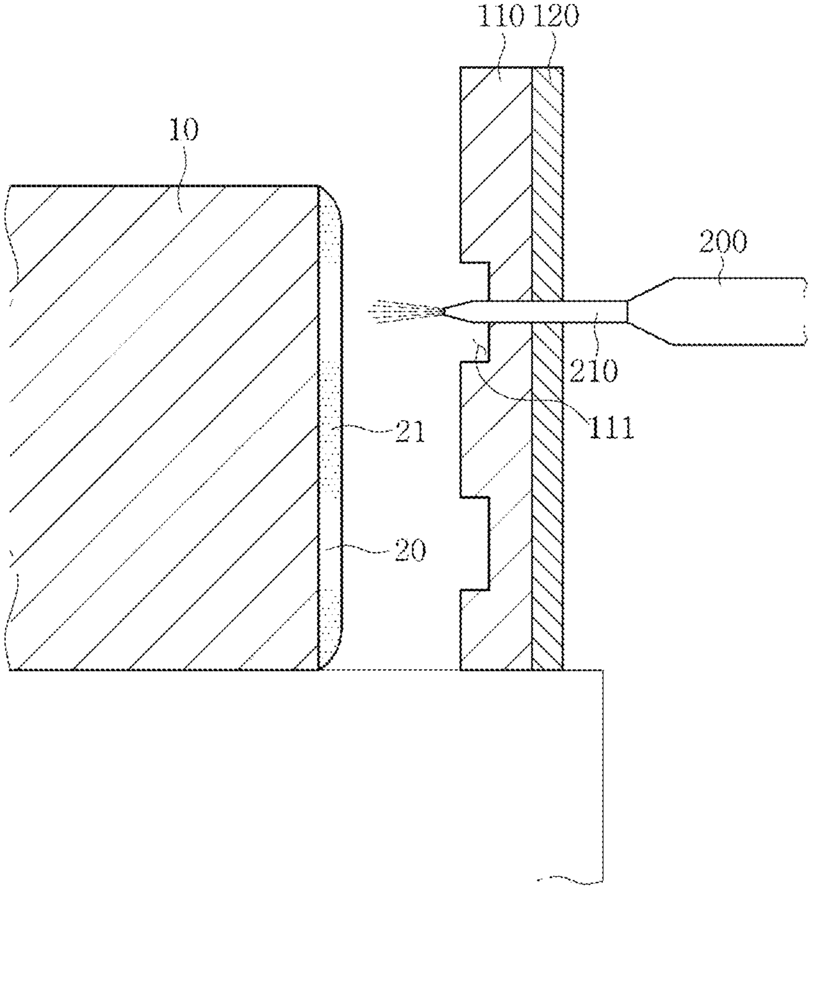
FIG. 20 is a cross-sectional view showing a modified example of the apparatus for forming a magnetic pigment pattern on an article shown in FIG. 16.

The spray unit 200 is disposed in the space between the article 10 and the magnetic pattern mold 110 and configured to spray an adhesive resin composite in this embodiment, but as shown in FIG. 20, the spray unit 200 may include a plurality of spray nozzles 210 that sprays an adhesive resin composite toward a pattern-forming object surface of an article 10 through nonmagnetic pattern grooves 111 of the magnetic pattern mold 110.

Figure 21:
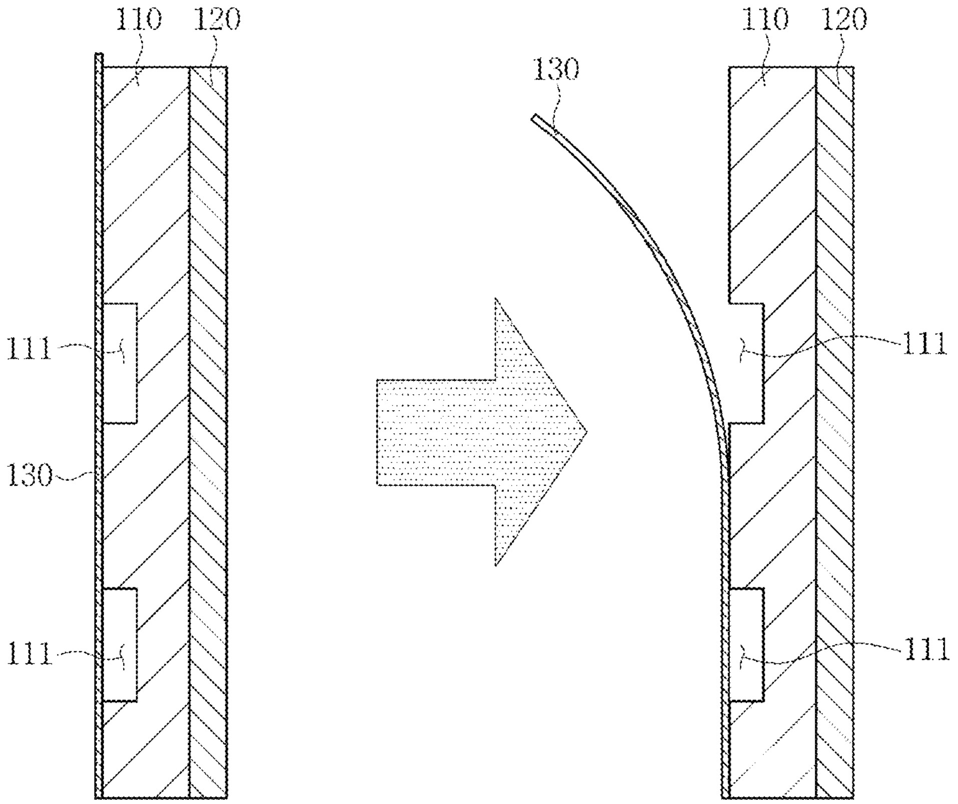
FIG. 21 is a cross-sectional view showing another modified example of the apparatus for forming a magnetic pigment pattern on an article shown in FIG. 16.

Further, when the work of forming a pattern by spraying an adhesive resin composite to an article 10 is repeated several times, magnetism may be decreased due to accumulation of the adhesive resin composite on the inner surface of the magnetic pattern mold 110. Accordingly, it is possible to perform a pattern-forming process without contaminating the magnetic pattern mold 110 and decreasing magnetism, as shown in FIG. 21, by detachably attaching a nonmagnetic protective film 130 to an inner surface of the magnetic pattern mold 110, that is, a surface facing a pattern-forming surface of an article 10 such that an adhesive resin composite is attached to the outer surface of the protective film 130, and easily detaching the protective film 130 from the magnetic pattern mold 110 after performing the pattern-forming process several times.

According to the present disclosure described above, when an adhesive resin composite containing a magnetic pigment is sprayed onto the surface of an article 10, a predetermined pattern can be formed on the surface of the article 10 while the magnetic pigment is arranged into a predetermined pattern by the magnetism of the magnetic pattern mold 110. Accordingly, a coating process of a pattern can be very quickly and easily achieved.

In particular, since the magnetic pattern mold 110 is made of a flexible and elastic material, nonmagnetic pattern grooves 111 are engraved into a groove or through-hole type in the magnetic pattern mold 110, and magnetic field lines are formed in areas outside the nonmagnetic pattern grooves 111, there is an advantage of very easily manufacturing a magnetic pattern mold 110 that can easily form magnetic field lines in a desired pattern and has a shape corresponding to the 3D shape of an article.

Further, when it is required to change the shape of a pattern to be coated on the surface of an article 10, it is possible to simply change the shape of the pattern by replacing the magnetic pattern mold 110, so it is also possible to easily change a pattern.

The mechanical strength of an article 10 having a resin pattern layer 20 with a pattern or a design formed by the method of forming a pattern is also increased by the resin pattern layer 20 formed on the surface thereof, so it is possible to expect excellent properties in comparison to articles having a pattern or a design expressed directly thereon in the related art.

Although the present disclosure was described in detail with reference to embodiments, the various substitutions, additions, and modifications may be possible by those skilled in the art without departing from the spirit of the present disclosure described above, and these modifications should be understood as being included in the protective range of the present disclosure defined by claims.

What is claimed is:

1. An apparatus for forming a predetermined magnetic pigment pattern on an article, the apparatus comprising:

a magnetic pattern mold having nonmagnetic pattern grooves engraved in a pattern opposite to the predetermined magnetic pigment pattern, and configured to generate magnetism in areas outside the nonmagnetic pattern grooves such that predetermined magnetic field lines are provided on a pattern-forming object surface of the article outside the nonmagnetic pattern grooves; and a sprayer configured to spray an adhesive resin composite containing a ferromagnetic pigment onto the pattern-forming object surface of the article such that the predetermined magnetic pigment pattern is formed by the ferromagnetic pigment of the adhesive resin composite that is applied to the pattern-forming object surface of the article and rearranged along the predetermined magnetic field lines generated by the magnetic pattern mold.

2. The apparatus of claim 1, further comprising a supporting plate made of a weak magnetic or nonmagnetic material and stacked on one surface of both surfaces of the magnetic pattern mold.

3. The apparatus of claim 2, wherein the supporting plate is formed in a mesh type.

4. The apparatus of claim 1, wherein the magnetic pattern mold is made of an elastic magnet magnetized with an N pole and an S pole arranged in a thickness direction of the magnetic pattern mold.

5. The apparatus of claim 4, wherein the magnetic pattern mold is magnetized with an N pole and an S pole arranged in the thickness direction by alternately stacking up and down a plurality of magnetic films made of an elastic material having a polarity of an N pole and a plurality of magnetic films made of an elastic material having a polarity of an S pole.

6. The apparatus of claim 4, wherein a nonmagnetic pattern of the magnetic pattern mold is filled with a filler made of nonmagnetic resin.

7. The apparatus of claim 4, wherein the magnetic pattern mold is detachably stacked on a bottom of the article while elastically deforming in a shape corresponding to the bottom of the article, and a separable adhesive is applied between a top of the magnetic pattern mold and the bottom of the article so that the magnetic pattern mold is temporarily bonded to the bottom of the article, and is separated from the article when a process of forming the predetermined magnetic pigment pattern is performed.

8. The apparatus of claim 7, further comprising a supporting plate made of a weak magnetic or nonmagnetic material in a mesh type and stacked on one surface of both surfaces of the magnetic pattern mold.

9. The apparatus of claim 1, wherein the magnetic pattern mold is installed at a predetermined distance from the pattern-forming object surface of the article, and the sprayer applies the adhesive resin composite to the pattern-forming object surface of the article by spraying the adhesive resin composite containing the ferromagnetic pigment to a space between the pattern-forming object surface of the article and the magnetic pattern mold.

10. The apparatus of claim 9, wherein the sprayer includes a plurality of spray nozzles spraying the adhesive resin composite toward the pattern-forming object surface of the article through the nonmagnetic pattern grooves of the magnetic pattern mold.

11. The apparatus of claim 9, further comprising a protective film made of a nonmagnetic material and detachably attached to a surface, which faces the pattern-forming object surface of the article, of surfaces of the magnetic pattern mold.

12. A method of forming the predetermined magnetic pigment pattern on the pattern-forming object surface of the article using the apparatus for forming the predetermined magnetic pigment pattern on the article of claim 1, the method comprising:

stacking the article on the magnetic pattern mold or disposing the article at a predetermined distance from the magnetic pattern mold (S1); and applying the adhesive resin composite to the pattern-forming object surface of the article by spraying the adhesive resin composite containing the ferromagnetic pigment onto the pattern-forming object surface of the article (S2), wherein the ferromagnetic pigment of the adhesive resin composite forms the predetermined magnetic pigment pattern on the pattern-forming object surface of the article while being arranged along the predetermined magnetic field lines of the magnetic pattern mold in the step (S2).

13. The method of claim 12, wherein coating a base layer made of paint having a predetermined color on the pattern-forming object surface of the article is performed before the step (S1) is performed.

14. The method of claim 12, wherein multiple resin pattern layers each having the predetermined magnetic pigment pattern are formed on the pattern-forming object surface of the article by sequentially repeating twice or more the step (S1) and the step (S2).

15. The method of claim 12, wherein the adhesive resin composite is hardened by applying heat or emitting ultraviolet light to the article when the step (S2) is performed.

* * * * *